United States Patent [19]

Beall

[11] 4,386,162
[45] May 31, 1983

[54] ALKALI METAL, CALCIUM FLUOROSILICATE GLASS-CERAMIC ARTICLES

[75] Inventor: George H. Beall, Big Flats, N.Y.
[73] Assignee: Corning Glass Works, Corning, N.Y.
[21] Appl. No.: 308,143
[22] Filed: Oct. 5, 1981
[51] Int. Cl.³ .......................... C03C 3/22; C03C 3/04
[52] U.S. Cl. .......................................... 501/3; 501/5; 501/57; 501/58; 501/59; 501/62; 501/63
[58] Field of Search .................. 501/3, 57, 58, 59, 62, 501/63

[56] References Cited

U.S. PATENT DOCUMENTS 3,799,836   3/1974   Rogers et al. ...................... 501/3 X
3,839,056  10/1974   Grossman ............................. 501/3

FOREIGN PATENT DOCUMENTS 863176    1/1953   Fed. Rep. of Germany .......... 501/3
22465    12/1961   German Democratic Rep. .... 501/3
1089202  11/1967   United Kingdom .................. 501/5

Primary Examiner—Helen M. McCarthy
Attorney, Agent, or Firm—Clinton S. Janes, Jr.

[57] ABSTRACT

The instant invention is directed to the production of highly crystalline glass-ceramic articles demonstrating high intrinsic mechanical strength and toughness containing crystals of canasite and/or agrellite and/or fedorite as the predominant crystal phase. The articles have overall compositions consisting essentially, expressed in terms of weight percent on the oxide basis, of about

|  |  |  |
|---|---|---|
|  | $SiO_2$ | 45–75 |
|  | CaO | 8–30 |
|  | F | 3.5–12 |
|  | $Na_2O$ | 3–15 |
|  | $K_2O$ | 0–20 |
| $Na_2O + $ | $K_2O$ | 5–25 |
|  | $B_2O_3$ | 0–6 |
|  | $Al_2O_3$ | 0–7 |
|  | $ZrO_2$ | 0–12 |

2 Claims, 2 Drawing Figures

2

ALKALI METAL, CALCIUM FLUOROSILICATE GLASS-CERAMIC ARTICLES

BACKGROUND OF THE INVENTION

Glass-ceramic articles, i.e., articles prepared by subjecting glass articles to a controlled heat treatment to effect crystallization in situ, are well known to the art. The method for producing such articles customarily involves three fundamental steps: first, a glass-forming batch is melted; second, the melt is simultaneously cooled to a temperature at least below the transformation range thereof and a glass body of a desired geometry shaped therefrom; and, third, the glass body is heated to temperatures above the transformation range of the glass in a controlled manner to generate crystals in situ. Frequently, the glass body is exposed to a two-stage heat treatment. Hence, the glass will be heated initially to a temperature within or somewhat above the transformation range for a period of time sufficient to cause the development of nuclei in the glass. Thereafter, the temperature will be raised to levels approaching or even exceeding the softening point of the glass to cause the growth of crystals on the previously-formed nuclei. The resultant crystals are commonly more uniformly fine-grained and the articles are typically more highly crystalline.

Because glass-ceramic articles are generally highly crystalline, viz., greater than 50% by volume crystalline, they are normally mechanically stronger than the precursor glass articles from which they were derived. Hence, annealed glass bodies conventionally demonstrate modulus of rupture values in the range of about 5,000–10,000 psi, whereas the glass-ceramic product will exhibit moduli of rupture over the interval of 10,000–20,000 psi. Although the latter values represent a significant improvement, numerous investigations have been undertaken to enhance the mechanical strength of glass-ceramic bodies. Two methods for achieving that goal have been utilized commercially. The first has involved applying a glaze to the surface of the glass-ceramic, which glaze has a coefficient of thermal expansion lower than that of the body. The second has comprehended subjecting the body to chemical strengthening via an ion exchange reaction. Both of those techniques are effective in increasing the mechanical strength of glass-ceramic articles, but both also have two practical disadvantages. Hence, both methods require the body to be subjected to a further process which adds cost to the product. More importantly, however, both procedures increase the internal tension in the body such that, upon breakage, the body tends to fragment into a large number of small pieces. This phenomenon is especially significant when the product is designed for consumer goods where "gentle" breakage is desired with a resultant few large pieces. Accordingly, a glass-ceramic having high intrinsic body strength would be most desirable.

SUMMARY OF THE INVENTION

The instant invention is directed to the production of translucent to opaque glass-ceramic articles which, as formed, can exhibit moduli of rupture in excess of 20,000 psi and, frequently, greater than 40,000 psi. The inventive articles have compositions consisting essentially, expressed in weight percent on the oxide basis, of:

|  | | |
|---|---|---|
| | $SiO_2$ | 45–75 |
| | CaO | 8–30 |
| | F | 3.5–12 |
| | $Na_2O$ | 3–15 |
| | $K_2O$ | 0–20 |
| $Na_2O + K_2O$ | | 5–25 |
| | $B_2O_3$ | 0–6 |
| | $Al_2O_3$ | 0–7 |
| | $ZrO_2$ | 0–12 |

In the most general terms, the inventive products are prepared via a three-step method:

First, a batch of a predetermined composition is melted;

second, the melt is simultaneously cooled to a temperature at least below the transformation range and a glass article of a desired configuration shaped therefrom; and then third, the glass article is exposed to a temperature within the range of about 500°–1000° C. for a period of time sufficient to cause the growth of crystals in situ.

It has frequently been observed that more uniformly fine-grained crystallization will be generated if the heat treatment of the glass article is undertaken in two stages. Moreover, subjecting the glass article to a nucleation treatment inhibits the possibility of the thermal deformation thereof as the temperature approaches and, perhaps, exceeds the softening point of the glass. Thus, prior nucleation leads to more rapid subsequent growth of crystals, these crystals being more refractory than the glass and thereby acting to render the article dimensionally stable to thermal deformation. Consequently, the glass article will initially be heated to about 500°–750° C. to develop nuclei and initiate the generation of crystals therein, after which the temperature will be raised to effect the growth of crystals on the nuclei. With the present compositions, fluorite ($CaF_2$) constitutes the nucleating phase which separates out of the glass at about 550° C. As is well known, crystallization proceeds more rapidly as the temperature is increased. Accordingly, exposures of no more than about 0.25 hour may be necessary at 900°–1000° C., whereas up to 12 hours and more may be demanded to achieve a very highly crystalline article at 750° C. Where a two-step heat treatment is employed, nucleation for about 0.5–6 hours followed by crystallization for about 0.5–8 hours has been found suitable to produce highly crystalline articles wherein the crystals are uniformly fine-grained.

The predominant crystal phases developed in situ in the inventive products appear to be Canasite, $Ca_5Na_4K_2[Si_{12}O_{30}]F_4$ with probable solid solution to $Ca_5Na_3K_3[Si_{12}O_{30}]F_4$, and/or Agrellite, $NaCa_2Si_4O_{10}F$ and/or Fedorite, the exact composition of which is not known but which is believed to approximate $K_{0.3}CaNa_{0.9}Al_{0.2}Si_{3.8}O_9F$, the presence of aluminum being deemed to be optional. Canasite is described by M. D. Dorfman, D. D. Rogachev, Z. I. Goroshchenko, and E. I. Uspenskaya in "Canasite, a New Mineral," *Trudy Mineralog. Muzeya Akad. Nauk S.S.R.*, No. 9, 156–166 (1959) and is further analyzed structurally by M. I. Chiragov, K. S. Mamedov, and N. V. Belov in "The Crystal Structure of Canasite-$Ca_5Na_4K_2[Si_{12}O_{30}]$ $(OH,F)_4$," *Dokl. Akad. Nauk S.S.R.*, 185, 672–674 (1969). Agrellite is disclosed by J. Gittins, M. G. Brown, and B. D. Sturman in "Agrellite, a New Rock-Forming Mineral in Regionally Metamorphosed Agpaitic Alkalic Rocks," *Can. Mineral.*, 14, 120–126

(1976). Fedorite is discussed by A. A. Kukharenko et al. in "The Caledonian Ultrabasic Alkalic Rocks and Carbonatites of the Kola Peninsula and Northern Karelia," *Izd. "Nedra,"* Moscow, 479–489 (1965). X-ray diffraction analyses conducted upon the inventive glass-ceramic products have yielded diffraction patterns closely approximating those of the naturally-occurring minerals. Therefore, although the identity of the crystals appearing in the inventive products has not been rigorously established, because of the apparent close similarity existing between them and the naturally-occurring minerals, the mineral names have been applied thereto and are used throughout this specification.

Canasite is a multiple chain silicate exhibiting an anisotropic, blade-like crystal habit. Structurally, the crystals are composed of parallel silicate chains crosslinked to make a long box-like backbone in which the potassium ions rest. These complex chain units are crosslinked into groups of four and are separated by networks composed primarily of $Na(O,F)_6$ and $Ca(O,F)_6$ octahedra. Some articles wherein canasite comprises essentially the sole crystal phase have displayed moduli of rupture in excess of 50,000 psi. The interlocking blade-like morphology of the crystals is assumed to account for the high strength of the final product.

Agrellite and fedorite are also anisotropic silicates but little is known of their structures, although the former exhibits an acicular habit and the latter evidences some similarity to the micaceous silicates. Because these crystals do not demonstrate as extensive an interlocking morphology as canasite, the mechanical strengths of articles wherein essentially the sole crystal phase is agrellite and/or fedorite will not normally exceed about 25,000 psi.

Analyses of the inventive highly crystalline glass-ceramics containing those crystal phases developed in situ have indicated a higher proportion of fluoride (F) vis-a-vis hydroxyl (OH) than is stated in the above literature to be present in the naturally-occurring minerals. Stated in another manner, the synthetic minerals generated in the inventive products are believed to constitute pure end members of a solid solution series involving OH and F.

The inventive products exhibit unusual toughness, i.e., resistance to impact. For example, sawn slabs thereof survive repeated hammer blows and dropping from heights which would normally fracture similarly-shaped articles of other glass-ceramic compositions. The mechanism underlying this significantly improved resistance to impact is not fully understood. However, there appears to be a relationship between enhanced impact resistance of the inventive glass-ceramic bodies and the fact that those bodies are highly crystalline, essentially monophase, and have interlocking microstructures. Furthermore, in certain instances there appears to be an advantage in having significant residual glass in the crystallized article, perhaps about 5–15% by volume. The inclusion of $Al_2O_3$ and/or $B_2O_3$ in the parent glass compositions limits the growth of the crystals, thereby promoting the development of fine-grained crystals, and leads to the formation of a viscous glassy phase, e.g., an alkali metal aluminosilicate and/or an alkali metal borosilicate, which, in turn, permits the production of a fine-grained body with a minimum amount of $CaF_2$ nucleant. This circumstance can promote both glass formability and stability. The glassy phase has a much lower coefficient of thermal expansion than the crystals, e.g., canasite exhibits a coefficient of thermal expansion (0°–300° C.) of about $150–155 \times 10^{-7}/°C.$, depending upon the existence of solid solutions in the crystal. This mismatch of expansion coefficients can, in some cases, give rise to the development of a fine network of microcracks in the crystallized body. A further indication of the existence of microcracking in certain of the articles is the observation that some of the inventive glass-ceramic articles demonstrate a woody or dull sound upon being impacted. In contrast, conventional glass-ceramic bodies typically issue a ringing sound when impacted. Nevertheless, despite the presence of microcracking, the inventive products remain phenomenally, intrinsically strong. (Too much $Al_2O_3$ and/or $B_2O_3$ promote excessive glass formation with consequent loss of strength and toughness).

Measurements of elastic moduli conducted on the microcracked glass-ceramics have determined values of about one-half that of normal canasite glass-ceramics. That situation means that the strain levels to which the inventive bodies can be subjected before fracture can be doubled for comparable moduli of rupture.

The operable glass compositions exhibit very advantageous melting and forming properties. Hence, the batches melt easily at temperatures of about 1250°–1350° C. and have relatively low liquidi, viz, between about 900°–1000° C. Also, the batches have the practical advantage of using comparatively inexpensive ingredients, e.g., sand, limestone, fluorspar, and soda ash. Hence, the batch cost is in the vicinity of that employed in commercial soda lime glass.

Because the inventive glasses crystallize very rapidly upon heat treatment, it is possible to secure high strength articles and to fire a glaze onto the articles in a single step. Thus, a frit can be applied to the parent glass article and then matured during the crystallization heat treatment. Furthermore, because the coefficient of thermal expansion of the inventive products is high, low temperature maturing glazes can be utilized since their inherent relatively high coefficients of expansion are compatible with those of the glass-ceramics. This circumstance is another point of practical advantage in the inventive products.

The most preferred composition area to obtain articles exhibiting very high mechanical strength and toughness, and wherein canasite comprises essentially the sole crystal phase present, consists, in weight percent, of:

| | |
|---|---|
| $SiO_2$ | 50–65 |
| $B_2O_3$ | 0–3 |
| $Al_2O_3$ | 0–3 |
| CaO | 15–24 |
| F | 5–9 |
| $Na_2O$ | 3–13 |
| $K_2O$ | 3–15 |
| $Na_2O + K_2O$ | 11–22 |
| $ZrO_2$ | 0–8 |

The optional addition of $ZrO_2$ can be advantageous in four aspects:

(1) it supplements the nucleation role of $CaF_2$, thereby allowing the development of fine-grained bodies with a minimum of fluoride;

(2) it acts to inhibit thermal deformation during the crystallization heat treatment of the precursor glass;

(3) it enhances the whiteness or opacity of the glass-ceramic body; and (4) it improves the chemical durability of the glass-ceramic body. The solubility of $ZrO_2$ in the inventive glasses is especially high, 10% by weight being easily dissolved.

Figure 1:
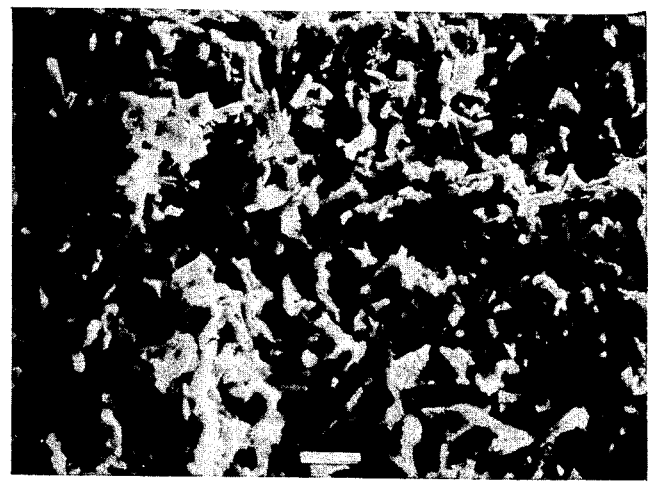
FIG. 1 is a photomicrograph illustrating a representative microstructure of the inventive glass-ceramic bodies.

drawn therefrom and the remainder of the melts poured into steel molds to yield rectangular glass slabs having the dimensions of about 6"×6"×0.5" and the slabs immediately transferred to an annealer operating at about 500° C.

Examples 1–23 formed colorless, transparent glasses, whereas Examples 25–27 formed white, opal glasses, the opacity resulting from the presence of $CaF_2$ crystallites therein. This opacity could be avoided by cooling the melts more rapidly.

Loss of fluoride through volatilization during melting averaged about 5–10% by weight.

TABLE I

|  | 1 | 2 | 3 | 4 | 5 | 6 | 7 | 8 | 9 | 10 |
|---|---|---|---|---|---|---|---|---|---|---|
| $SiO_2$ | 57.0 | 63.0 | 56.5 | 55.7 | 58.2 | 58.7 | 55.6 | 54.2 | 58.5 | 57.5 |
| CaO | 12.9 | 10.0 | 13.0 | 13.2 | 10.3 | 11.2 | 12.1 | 11.8 | 10.1 | 11.4 |
| $CaF_2$ | 13.0 | 11.0 | 11.7 | 11.1 | 11.9 | 12.2 | 15.8 | 17.9 | 12.0 | 12.0 |
| $Na_2O$ | 9.8 | 9.0 | 9.8 | 9.6 | 8.3 | 9.1 | 9.5 | 9.3 | 7.7 | 8.8 |
| $K_2O$ | 7.4 | 7.0 | 7.3 | 6.3 | 8.9 | 7.0 | 7.2 | 7.0 | 5.8 | 8.5 |
| $Al_2O_3$ | — | — | — | — | 2.7 | — | — | — | 4.7 | 2.0 |
| $B_2O_3$ | — | — | — | — | — | 2.0 | — | — | — | — |
| $ZrO_2$ | — | — | 1.8 | 1.2 | — | — | — | — | — | — |
| BaO | — | — | — | 3.1 | — | — | — | — | — | — |
| $Li_2O$ | — | — | — | — | — | — | — | — | 1.4 | — |

|  | 11 | 12 | 13 | 14 | 15 | 16 | 17 | 18 | 19 | 20 |
|---|---|---|---|---|---|---|---|---|---|---|
| $SiO_2$ | 57.0 | 59.0 | 56.3 | 57.3 | 57.1 | 56.5 | 57.0 | 69.8 | 57.0 | 55.6 |
| CaO | 11.0 | 9.0 | 10.9 | 8.4 | 11.5 | 12.0 | 11.0 | 3.7 | 11.0 | 13.6 |
| $CaF_2$ | 13.0 | 13.0 | 11.9 | 12.5 | 11.5 | 13.0 | 13.0 | 12.0 | 12.5 | 12.2 |
| $Na_2O$ | 9.0 | 9.0 | 4.4 | 8.7 | 6.6 | 9.0 | 8.0 | 11.3 | 8.0 | 8.9 |
| $K_2O$ | 8.0 | 8.0 | 14.7 | 8.3 | 11.7 | 8.5 | 9.0 | 3.4 | 9.0 | 7.6 |
| $Al_2O_3$ | 2.0 | 2.0 | 2.0 | 2.0 | 2.0 | 1.0 | 2.0 | — | 1.5 | — |
| $B_2O_3$ | — | — | — | — | — | — | — | — | 1.0 | — |
| MgO | — | — | — | 2.0 | — | — | — | — | — | — |
| $TiO_2$ | — | — | — | — | — | — | — | — | — | 2.0 |

|  | 21 | 22 | 23 | 24 | 25 | 26 | 27 | 28 | 29 |
|---|---|---|---|---|---|---|---|---|---|
| $SiO_2$ | 57.0 | 53.7 | 57.0 | 60.9 | 55.0 | 58.0 | 60.2 | 53.2 | 51.0 |
| CaO | 11.0 | 8.5 | 11.0 | 19.8 | 10.5 | 18.0 | 18.0 | 11.3 | 10.7 |
| $CaF_2$ | 13.0 | 12.2 | 13.0 | 12.0 | 12.0 | 14.0 | 12.0 | 12.3 | 15.3 |
| $Na_2O$ | 8.0 | 7.5 | 8.9 | 7.9 | — | 8.0 | 8.0 | 6.6 | 6.5 |
| $K_2O$ | 9.0 | 8.5 | 9.0 | — | 21.0 | — | — | 9.4 | 9.3 |
| $Al_2O_3$ | 2.0 | 1.9 | 4.0 | — | 2.0 | 2.0 | 2.0 | 0.9 | — |
| Cl | 1.0 | — | — | — | — | — | — | — | — |
| PbO | — | 7.5 | — | — | — | — | — | — | — |
| $P_2O_5$ | — | — | 3.0 | — | — | — | — | — | — |
| $ZrO_2$ | — | — | — | — | — | — | — | 5.7 | 7.4 |

DESCRIPTION OF PREFERRED EMBODIMENTS

Table I records a number of glass compositions, expressed in terms of parts by weight on the oxide basis, illustrating the parameters of the instant invention. Inasmuch as it is not known with which cation(s) the fluoride is combined, it is merely reported as $CaF_2$, the batch constituent by which the fluoride was incorporated into the glass. Moreover, because the sum of the individual components of the recited glasses totals or closely totals 100, for all practical purposes the tabulated values may be deemed to reflect weight percent. The batch ingredients for preparing glasses falling within the inventive composition ranges may comprise any materials, either the oxides or other compounds, which, upon being melted together, will be converted into the desired oxide in the proper proportions.

The exemplary glasses recorded in Table I were produced in the following manner. The batch materials were compounded, ballmilled together to assist in securing a homogeneous melt, deposited into platinum crucibles, lids placed upon the crucibles, and the crucibles introduced into a furnace operating at 1250°–1450° C. After about four hours, the crucibles were removed from the furnace, cane having a diameter of about 0.24"

The cane samples were cut into lengths of about 4" to be used for obtaining measurements of moduli of rupture in accordance with conventional procedures. Those lengths, plus the remainder of each slab, were then subjected to the heat treatment schedules reported in Table II. In each instance, the temperature of an electrically-heated furnace was raised at about 5° C./minute to the levels recorded and the samples cooled to room temperature by simply cutting off the electricity to the furnace and allowing the furnace to cool with the samples retained therein. This "cooling at furnace rate" averaged about 3°–5° C./minute.

The crystallized bodies exhibited a white appearance and, in the main, contained crystals demonstrating an interlocking, lath-like morphology. The identity of the crystal phase(s) present in each specimen, as determined via X-ray diffraction analysis, is tabulated as are average moduli of rupture where measured.

TABLE II

| Example | Heat Treatment | Crystal Phases | Modulus of Rupture |
|---|---|---|---|
| 1 | 700° C. for 2 hours 900° C. for 4 hours | Canasite | — |
| 2 | 700° C. for 2 hours | Canasite | — |

TABLE II-continued

| Example | Heat Treatment | Crystal Phases | Modulus of Rupture |
|---|---|---|---|
|  | 900° C. for 4 hours |  |  |
| 3 | 700° C. for 2 hours | Canasite | — |
|  | 900° C. for 4 hours |  |  |
| 4 | 700° C. for 2 hours | Canasite | — |
|  | 900° C. for 4 hours |  |  |
| 5 | 800° C. for 2 hours | Canasite | 39,100 psi |
|  | 875° C. for 4 hours |  |  |
| 6 | 700° C. for 2 hours | Canasite | 33,200 psi |
|  | 800° C. for 4 hours |  |  |
|  | 875° C. for 4 hours |  |  |
| 6 | 700° C. for 2 hours | Canasite | — |
|  | 800° C. for 4 hours |  |  |
|  | 900° C. for 4 hours |  |  |
| 7 | 700° C. for 2 hours | Canasite | 41,100 psi |
|  | 800° C. for 4 hours | CaF$_2$ |  |
|  | 900° C. for 4 hours |  |  |
| 7 | 700° C. for 2 hours | Canasite | 39,700 psi |
|  | 900° C. for 4 hours | CaF$_2$ |  |
| 8 | 800° C. for 2 hours | Canasite | 40,000 psi |
|  | 875° C. for 4 hours | CaF$_2$ |  |
| 8 | 700° C. for 2 hours | Canasite | 42,500 psi |
|  | 800° C. for 4 hours | CaF$_2$ |  |
|  | 900° C. for 4 hours |  |  |
| 9 | 560° C. for 4 hours | Canasite | — |
|  | 880° C. for 4 hours |  |  |
| 10 | 560° C. for 2 hours | Canasite | — |
|  | 880° C. for 4 hours |  |  |
| 11 | 880° C. for 0.5 hour | Canasite | 53,200 psi |
| 12 | 880° C. for 0.5 hour | Canasite | 31,400 psi |
| 12 | 560° C. for 4 hours | Canasite | 41,800 psi |
|  | 800° C. for 2 hours |  |  |
|  | 880° C. for 4 hours |  |  |
| 13 | 580° C. for 2 hours | Canasite | — |
|  | 800° C. for 2 hours |  |  |
|  | 880° C. for 4 hours |  |  |
| 14 | 560° C. for 4 hours | Canasite | — |
|  | 800° C. for 2 hours |  |  |
|  | 880° C. for 4 hours |  |  |
| 15 | 560° C. for 4 hours | Canasite | 47,300 psi |
|  | 800° C. for 2 hours |  |  |
|  | 880° C. for 4 hours |  |  |
| 16 | 560° C. for 4 hours | Canasite | 43,500 psi |
|  | 800° C. for 2 hours |  |  |
|  | 880° C. for 4 hours |  |  |
| 16 | 560° C. for 4 hours | Canasite | 53,100 psi |
|  | 800° C. for 6 hours |  |  |
| 17 | 880° C. for 2 hours | Canasite | 43,800 psi |
| 17 | 560° C. for 4 hours | Canasite | 45,600 psi |
|  | 800° C. for 2 hours |  |  |
|  | 880° C. for 4 hours |  |  |
| 18 | 560° C. for 4 hours | Fedorite | — |
|  | 800° C. for 2 hours |  |  |
|  | 880° C. for 4 hours |  |  |
| 19 | 560° C. for 4 hours | Canasite | 44,600 psi |
|  | 800° C. for 2 hours |  |  |
|  | 880° C. for 4 hours |  |  |
| 19 | 880° C. for 0.5 hour | Canasite | 41,300 psi |
| 20 | 560° C. for 4 hours | Canasite | — |
|  | 800° C. for 2 hours |  |  |
|  | 880° C. for 4 hours |  |  |
| 21 | 560° C. for 4 hours | Canasite | 41,200 psi |
|  | 800° C. for 2 hours |  |  |
|  | 880° C. for 4 hours |  |  |
| 22 | 560° C. for 4 hours | Canasite | 24,100 psi |
|  | 800° C. for 2 hours |  |  |
|  | 880° C. for 4 hours |  |  |
| 23 | 560° C. for 4 hours | Canasite | — |
|  | 800° C. for 2 hours |  |  |
|  | 880° C. for 4 hours |  |  |
| 24 | 560° C. for 4 hours | Agrellite | — |
|  | 800° C. for 2 hours |  |  |
|  | 880° C. for 2 hours |  |  |
| 25 | 580° C. for 2 hours | Unidentified | Weak |
|  | 800° C. for 2 hours |  |  |
|  | 880° C. for 2 hours |  |  |
| 26 | 650° C. for 4 hours | Agrellite | 22,000 psi |
|  | 950° C. for 4 hours |  |  |
| 27 | 650° C. for 4 hours | Agrellite | 24,200 psi |
|  | 950° C. for 4 hours |  |  |
| 28 | 550° C. for 1 hour | Canasite | — |
| 29 | 880° C. for 1 hour | Canasite | — |
|  | 550° C. for 1 hour |  |  |
|  | 880° C. for 1 hour |  |  |

As can be observed from a study of the above tables, various compatible metal oxides can be included in the base compositions to alter the melting, forming, chemical, and/or physical properties of the glass and/or glass-ceramic without substantially affecting the desired strength and toughness in the inventive products. Conventional colorants may also be included with care. In general, individual additions of all such ingredients, other than $ZrO_2$, will not exceed about 5% and the total thereof will most preferably be less than about 10%.

Also, Example 25 illustrates the need to utilize compositions within the prescribed ranges to achieve articles of high mechanical strength. Thus, that product was so weak that it could be broken between the fingers. X-ray diffraction analyses have not been able to satisfactorily identify the predominant crystal phase in the product.

The typical morphology exhibited by the lath-like canasite crystals grown in situ in the inventive products involves a thickness generally less than about one micron, a width commonly varying between about 0.25–2 microns, and a length normally ranging between about 1–25 microns. Crystals of still larger dimensions can be developed by reducing the rate of nucleation or increasing the rate of crystal growth. Those modifications can be achieved via changes in precursor glass composition and/or in the crystallization heat treatment.

Figure 2:
FIG. 2 is a photomicrograph taken at a higher magnification depicting a representative microstructure of the inventive glass-ceramic bodies.

FIGS. 1 and 2 are scanning electron micrographs of Example 6 heat treated in accordance with the schedule set out in Table II therefor. FIG. 1 illustrates a magnification of 1000 diameters and FIG. 2 5000 diameters. The white bar at the base of each photomicrograph represents a distance of 10 microns. The interlocking, lath-like morphology of the canasite crystals is clearly evident.

In a few instances, bars having dimensions of about 4"×0.25"×0.25" were sawn from the above-described glass-ceramic slabs and modulus of rupture values determined thereon. In general, those values averaged about 80% of those measured on the cane samples.

To summarize, because of their inherent high mechanical strength and toughness, the inventive materials possess two very practical properties:

(a) they demonstrate gentle breakage, as is evidenced by the fact that, when a 10" diameter dinner plate pressed from Example 16 of Table I and heat treated for one hour at a top temperature of 880° C. was dropped from a height of 72" onto a wooden block to cause breakage, the plate fractured into only about six pieces; and (b) they can be finished after forming in like manner to high strength ceramics demonstrating similar mechanical strengths, e.g., SiC, $Al_2O_3$, and $Si_3N_4$, and unlike laminated structures having surface compression layers thereon which fragment forcefully when sawed or otherwise penetrated.

They do possess the practical advantages of:

(1) being meltable at relatively low temperatures (~1250°–1400° C.);

(2) being formable at relatively low temperatures (~900°–1200° C.);

(3) being rapidly crystallizable at relatively low temperature (~1–2 hours at ~500°–900° C.); and (4) being producible from relatively inexpensive batch materials.

I claim:

1. A highly crystalline glass-ceramic article exhibiting high toughness and a modulus of rupture in excess of 20,000 psi, wherein the predominant crystal phase is canasite and/or agrellite and/or fedorite, and having an overall composition consisting essentially, expressed in terms of weight percent on the oxide basis, of about

|  | | |
|---|---|---|
| | $SiO_2$ | 45–75 |
| | CaO | 8–30 |
| | F | 3.5–12 |
| | $Na_2O$ | 3–15 |
| | $K_2O$ | 0–20 |
| $Na_2O +$ | $K_2O$ | 5–25 |
| | $B_2O_3$ | 0–6 |
| | $Al_2O_3$ | 0–7 |
| | $ZrO_2$ | 0–12 |

2. A glass-ceramic article according to claim 1 wherein said composition consists essentially of about

|  | | |
|---|---|---|
| | $SiO_2$ | 50–65 |
| | CaO | 15–24 |
| | F | 5–9 |
| | $Na_2O$ | 3–13 |
| | $K_2O$ | 3–15 |
| $Na_2O +$ | $K_2O$ | 11–22 |
| | $B_2O_3$ | 0–3 |
| | $Al_2O_3$ | 0–3 |
| | $ZrO_2$ | 0–8 |

* * * * *